United States Patent [19]

Maitani et al.

[11] 4,403,843
[45] Sep. 13, 1983

[54] SWITCHING ASSEMBLY FOR FOCUSSING, PHOTOSENSITIVE ELEMENTS OF A CAMERA

[75] Inventors: Yoshihisa Maitani; Mitsuo Kawazoe, both of Hachioji, Japan

[73] Assignee: Olympus Optical Company Ltd., Japan

[21] Appl. No.: 360,553

[22] Filed: Mar. 22, 1982

[30] Foreign Application Priority Data

Jun. 10, 1981 [JP] Japan .................................. 56-90155

[51] Int. Cl.³ .............................................. G03B 3/00
[52] U.S. Cl. .................................................. 354/25
[58] Field of Search .................. 354/25 R, 25 A, 25 F, 354/25 P, 31, 31 F, 197, 286; 352/140, 142

[56] References Cited

U.S. PATENT DOCUMENTS 4,246,476  1/1981  Stauffer ............................. 354/25 X
4,269,497  5/1981  Ishizaka et al. ..................... 354/286

FOREIGN PATENT DOCUMENTS 55-143404  11/1980  Japan .
55-144211  11/1980  Japan ............................... 354/25 R Primary Examiner—William B. Perkey
Attorney, Agent, or Firm—Ostrolenk, Faber, Gerb & Soffen

[57] ABSTRACT

For use with a camera which is adapted for use with at least two interchangeable lenses having different brightness levels, a switching assembly is provided to enable one of at least two focussing, photosensitive elements each associated with a different one of the lenses. The switching assembly comprises first means normally assuming a first predetermined position in which one of the elements is enabled for operation, said one element being effective to detect an in-focus position when a corresponding interchangeable lens is mounted, and second means adapted to be forcibly displaced from a position in which said one element is enabled to another position in which the other element is enabled for operation.

6 Claims, 5 Drawing Figures

SWITCHING ASSEMBLY FOR FOCUSSING, PHOTOSENSITIVE ELEMENTS OF A CAMERA

BACKGROUND OF THE INVENTION

This invention relates to a switching assembly for use with focussing, photosensitive elements which are used in a photographic camera, and more particularly, to such switching assembly for use with the camera of the type in which at least two interchangeable lenses having different brightness levels may be mounted and including at least two focussing, photosensitive elements associated with each of the interchangeable lenses.

A photographic camera of the TTL (through the lens) type is known (see Japanese Laid-Open Patent Application No. 143,404/1980) which permits a selective use of a first focussing, photosensitive element which permits the determination of an in-focus position in response to light from an object being photographed which is of a low brightness as transmitted through a taking lens of a relatively high brightness (for example, F2), and a second focussing, photosensitive element which permits such determination in response to light from an object being photographed which is transmitted through a taking lens of a relatively low brightness (for example, F4, such as telephoto lens). In such camera, each time a photographer mounts a different interchangeable lens on the camera, the type of the interchangeable lens is confirmed, and a corresponding focussing, photosensitive element is switched into a circuit. There are times when a photographer is so absorbed in the photographing operation that he will forget to constitute the switching operation even though another interchangeable lens has been mounted, thus leaving the photosensitive element associated with the old interchangeable lens in position into a circuit. This results in improper determination of an in-focus position.

A photographic camera of the TTL type is also known in which every interchangeable lens is provided with a signal pin for transmitting an electrical signal therethrough and which is arranged so that the pin may be utilized to effect an electrical switching between a plurality of focussing, photosensitive elements disposed within the camera (see Japanese Laid-Open Patent Application No. 144,211/1980). However, the switching arrangement in this pending application requires a complex construction and results in an expensive arrangement. In addition, the use of the usual interchangeable lenses having no signal pins is prevented, and thus the described switching arrangement is unavailable to the owner of such interchangeable lenses.

SUMMARY OF THE INVENTION

In view of the foregoing, it is an object of the invention to provide a switching assembly for focussing, photosensitive elements which is directly usable with conventional interchangeable lenses, and in which the adverse result of forgetting to institute the switching operation is prevented by an arrangement in which a focussing element is automatically selected which is associated with a general purpose interchangeable lens such as an interchangeable lens of a high brightness of F2, for example, which is commonly used, at the time when the lens is changed.

In accordance with the invention, whenever an interchangeable lens is mounted on the camera, the focussing element which is associated with a normally used, general purpose interchangeable lens (an interchangeable lens of a high brightness such as F2, for example), is automatically selected and hence a switching operation is required only when an interchangeable lens (of a low brightness equal to or greater than F4, for example, such as telephoto lens) is used, which is a rare occurrence. Conversely, when an interchangeable lens of a low brightness such, as a telephoto lens is normally used, an arrangement may be made to select a corresponding focussing, photosensitive element normally while requiring a switching operation when an interchangeable lens of a high brightness such as a wide angle lens of or greater than F2, for example, is used at rare occurrences. In this manner, in either instance, when the normally used interchangeable lens is mounted, the circuit within the camera is switched to a corresponding focussing element, thus completely avoiding a failure as a result of forgetting a switching operation. In this manner, the use of conventional interchangeable lenses is enabled.

DESCRIPTION OF PREFERRED EMBODIMENT

Figure 1:
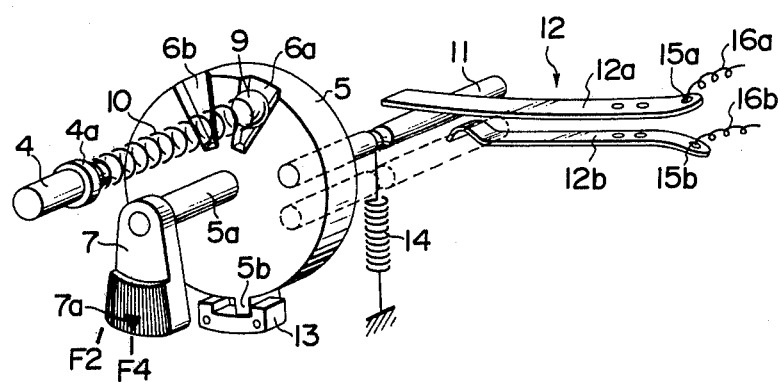
FIG. 1 is a perspective view of a switching assembly according to one embodiment of the invention.

Referring to FIG. 1, the switching assembly for focussing, photosensitive elements according to one embodiment of the invention includes a switching member 5 which is displaceable between a first and a second switch position by means of a switching knob 7. The switching member 5 fixedly carries a pin 11 disposed for cooperation with a changeover switch 12. The switching member 5 may be maintained in either first or second position by means of a click stop mechanism including a pair of detent grooves 6a, 6b which are formed in the switching member 5 at circumferentially spaced points, a detent ball 9 adapted to engage one of the detent grooves 6a, 6b, and a coiled spring 10 which urges the ball 9 into engagement with one of the grooves. The spring 10 is associated with a compression pin 4 which may be actuated to cause the spring 10 to be compressed when a particular interchangeable lens is mounted on the camera. A return spring 14 is provided for returning the switching member 5 to its first position when the particular interchangeable lens is not mounted.

Figure 2:
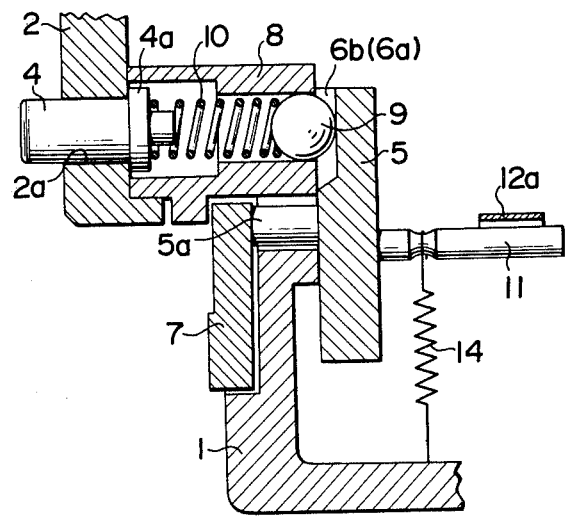
FIG. 2 is an enlarged cross section of the switching assembly shown in FIG. 1.

The switching member 5 is in the form of a disc having a shaft 5a fixedly mounted in alignment with the center thereof. As shown in FIG. 2, the shaft 5a extends through an opening in a front wall 1 of the camera so as to be supported thereby in a rotatable manner, whereby it is rotatably disposed below and inwardly of a lens mount 2. The knob 7 is in the form of an inverted sector and is integrally connected to the front end of the shaft 5a at its top. The knob 7 is located on the front surface of the camera 1 below the lens mount 2. Along its lower periphery, the knob is imprinted with an arrow index 7a, as shown in FIG. 1, and indications designating the brightness of interchangeable lenses such as F2, F4 are imprinted on the front surface of the camera 1 along a path of angular movement of the knob, and hence the index 7a. It is to be understood that an arrangement is made such that as the knob 7 is turned to bring the index 7a into alignment with one of the indications F2, F4, a corresponding focussing, photosensitive element is connected in a circuit within the camera. The detent grooves 6a, 6b are formed in the front surface of the switching member 5 in its top region so as to extend radially.

The pin 4 is disposed within an opening 2a formed in the bottom of the lens mount 2 so as to extend in parallel relationship with the optical axis of the lens, and is reciprocable therein. A cylindrical guide member 8 is secured around the opening 2a and extends inwardly therefrom. A flange 4a is formed on the pin 4 toward its inner end, and is disposed within the guide member 8 together with the ball 9, with the spring 10 interposed therebetween.

The pin 11 is fixedly mounted on the switching member 5 at a position offset from the axis thereof, or to the right thereof, as viewed in FIG. 1, and extends rearwardly. The changeover switch 12 is disposed on a path of movement of the pin 11. The spring 14, which is a coil tension spring, extends between the pin 11 and the bottom wall of the camera 1. A U-shaped member 13 is disposed in the camera 1 and receives therein a tab 5b radially projecting from the peripheral surface of the switching member 5 in its bottom region in order to determine the extent of angular movement of the switching member 5.

Figure 3:
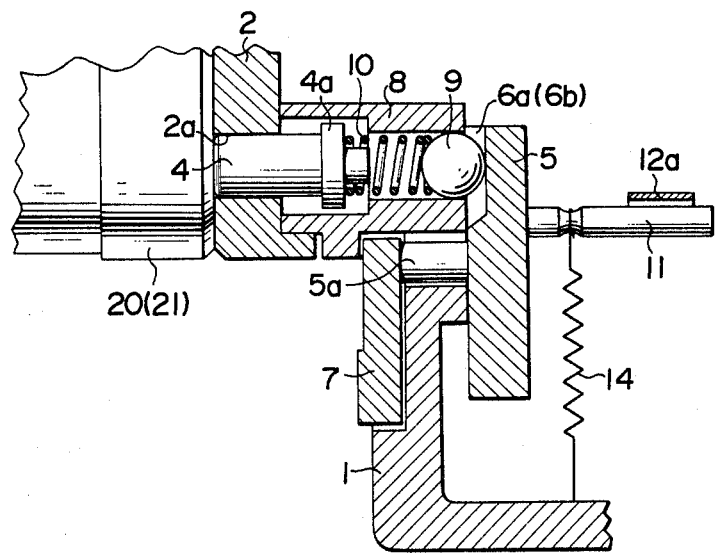
FIG. 3 is an enlarged cross section of the switching assembly of FIG. 2 when it is in its operative position.
Figure 4:
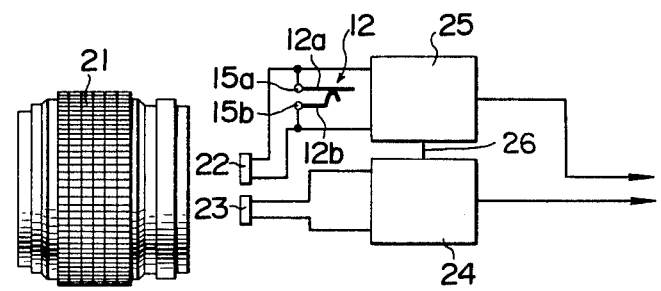
FIGS. 4 and 5 are circuit diagrams illustrating different focussing elements selected.
Figure 5:
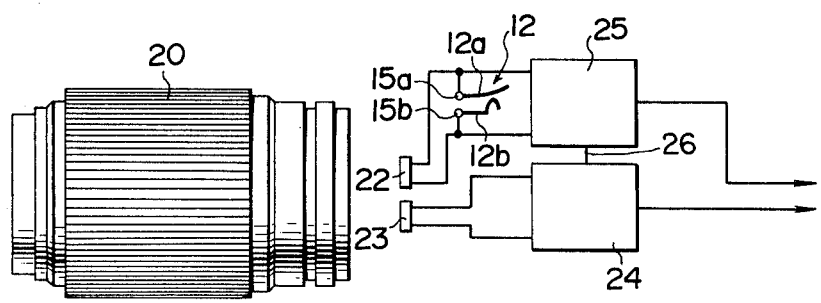

As will be seen, the inner end face of the guide member 8 faces the detent grooves 6a, 6b formed in the switching member 5, and the ball 9 which is fitted into the inner end of the guide member 8 is a press fit in the groove 6b with a reduced magnitude of force, exerted by the coiled spring 10, under the condition shown in FIG. 2 or when the pin 4 projects forwardly of the front surface of the lens mount 2. However, when an interchangeable lens is mounted on the camera to press the pin 4 into the lens mount as shown in FIG. 3, the ball is strongly pressed into the detent groove 6b (6a). The resilience of the both coiled springs 10, 14 are chosen such that the resilience or tension applied by the coiled spring 14 to return the switching member 5 clockwise to its first position is greater than the resistance against rotation of the switching member 5 which is produced by the forced engagement of the ball 9 with the detent groove 6a when the interchangeable lens is not mounted as shown in FIG. 1, but is less than such resistance against rotation of the switching member 5 produced by the engagement of the ball 9 with the groove 6a when the interchangeable lens is mounted as shown in FIG. 3. The changeover switch 12 is a normally closed switch including a movable contact 12a and a fixed contact 12b. When the switching member 5 assumes an angular position shown in FIG. 1 in which the ball 9 is a press fit in the right-hand detent groove 6a and the pin 11 assumes its upper position, the movable contact 12a is pushed upward against its own resilience and thus is kept away from the fixed contact 12b. However, when the switching member 5 rotates clockwise to cause the pin 11 to assume its lower position indicated in phantom lines, the free end of the movable contact 12a is allowed to move downward, by its own resilience, into contact with the fixed contact 12b. When contacts 12a, 12b engage each other, a pair of terminals 15a, 15b mounted on the respective contacts 12a, 12b are connected through lead wires 16a, 16b to short-circuit one of focussing, photosensitive elements, 22, as indicated in FIG. 4, while allowing the other focussing, photosensitive element 23 associated with a general purpose interchangeable lens 21 (which is normally used) and its corresponding in-focus detector 24 to be operative. When the contacts 12a, 12b are disengaged from each other as shown in FIGS. 1 and 5, the element 22 and its corresponding in-focus detector 25 are enabled for operation.

Before describing the operation of the switching assembly according to the invention, it is to be understood that in the present embodiment, it is assumed that a general purpose interchangeable lens 21 which is normally used represents a lens of a high brightness (F2, for example) while another interchangeable lens 20 which is rarely used represents a lens of a low brightness, such as F4, for example. However, it should be noted that the operation of the invention remains the same when the reverse is true. In FIG. 2, no interchangeable lens 20 (21) is mounted on the camera, and hence the compression pin 4 projects forwardly of the lens mount 2. Under this condition, the resilience of the coiled spring 10 disposed within the guide member 8 and which has its left-hand end bearing against the flange 4a causes the compression pin 4 to be driven to the left while its right-hand end causes the ball 9 to be a press fit in the detent groove 6b formed in the switching member 5. Since the coiled spring 10 then assumes a length very close to its natural or unstressed length, the resilience exerted by the spring is very weak. Consequently, the resistance against rotation of the switching member 5 which is produced by the engagement of the ball 9 is minimal, so that the greater resilience of the return spring 14 causes the switching member 5 to rotate clockwise, as viewed in FIG. 1, until the tab 5b bears against the left-hand sidewall of the detent member 13, thus limiting the angular movement. The pin 4 is located opposite to the detent groove 6b in the switching member 5, whereby the ball 9 is a press fit therein. In this manner, when no interchangeable lens 20, 21 is mounted, as shown in FIG. 2, the pin 4 is located opposite to the detent groove 6b with the interposition of the spring 10 and the ball 9 therebetween, and the pin 11 fixedly mounted on the switching member 5 moves downward, allowing the movable contact 12a to engage the fixed contact 12b, thus enabling the operation of the in-focus detector 24 including the focussing, photosensitive element 23 associated with the general purpose interchangeable lens 21 which is normally used. Thus, when the general purpose interchangeable lens 21 is actually mounted on the camera 1 under such condition, its lens mount presses the compression pin 4 inward to increase the resilience of the spring 10, whereby the ball 9 engages the detent groove 6b with an increased force to establish the first position of the switching member. Accordingly, the in-focus detector 24 inclusive of the element 23 is enabled for operation without requiring any particular switching operation, thus avoiding the difficulty that a switching operation may be forgotten to result in an adverse operation.

When the interchangeable lens 20 of a low brightness (such as F4, for example) which is only rarely used is mounted on the camera 1 which is in the configuration shown in FIG. 2, the only change occurs from the condition of FIG. 2 (when no interchangeable lens is mounted) to the condition shown in FIG. 3 when the interchangeable lens is mounted, remains the same as mentioned previously. Since the switching member 5 is locked with the compression pin 4 located opposite to the detent groove 6b, the changeover switch 12 assumes a position in which the in-focus detector 24 inclusive of the element 23 associated with the interchangeable lens 21 of a high brightness is enabled for operation, in the same manner as when the interchangeable lens 21 (for example, F2) is mounted. The solid line 26 between focus detectors 24 and 25 is representative of the necessary connection between switch 12 and elements 23, 24 in order to permit switch 12 to enable and disable these elements. Specifically, the movable contact 12a engages the fixed contact 12b. When the interchangeable lens 20 of a low brightness is mounted, the knob 7 is used to move the switching member 5 counterclockwise against the resistance produced by the increased resilience of the coiled spring 10 which is compressed between the compression pin 4 and the ball 9, thus bringing the index 7a on the knob 7 into alignment with the designation F4 (see FIG. 1). The ball 9 is strongly pressed into the detent groove 6a as shown in FIG. 1, thus maintaining the switching member 5 at such angular position. In addition, the pin 11 moves upward to raise the free end of the movable contact 12a upward, whereby the switch 12 assumes a position in which the in-focus detector 25 inclusive of the element 22 associated with the interchangeable lens 20 is enabled for operation. It will thus be seen that the switching member 5 has been displaced to its second position. If the interchangeable lens 20 is now dismounted, the resistance against rotation of the switching member 5 which is produced by the combination of the pin 4, spring 10 and ball 9 is reduced, whereby the tensile resilience of the return spring 14 automatically turns the switching member 5 clockwise, thus moving the pin 11 downward to allow the movable contact 12a to engage the fixed contact 12b, whereby the in-focus detector 24 inclusive of the element 23 associated with the interchangeable lens 21 of a high brightness is enabled for operation. Thus, there is no need to perform a switching operation when a general purpose interchangeable lens of a high brightness is to be used, preventing any adverse result which might result from the failure of performing a switching operation.

It will be seen from the foregoing that the invention has provided a switching assembly for focussing, photosensitive elements as mentioned initially in the specification. It is to be understood that while the illustrated assembly is adapted for use with a pair of focussing, photosensitive elements which are associated with a general purpose interchangeable lens and a special interchangeable lens, there may be provided a plurality of focussing, photosensitive elements associated with a plurality of special interchangeable lenses.

What is claimed is:

1. In a camera having an interchangeable lens mount which is capable of receiving lenses having different brightness levels, said combination comprising:
   a brightness switch which is manually moveable between first and second brightness positions and will remain in the position in which it is placed when a lens is mounted on said lens mount and which is automatically biased into said first brightness position whenever there is no lens mounted on said lens mount; and
   an in-focus detector circuit for detecting an in-focus condition as a function of the amount of light which passes through a lens mounted on said lens mount, said in-focus detector operating in a first manner which presumes that a lens having a first brightness level is mounted on said lens mount when said brightness switch is in said first position and operating in a second manner which presumes that a lens having a second brightness level is mounted on said lens mount when said brightness switch is in said second brightness position.

2. The combination of claim 1, wherein said in-focus detector includes first and second photosensitive members and wherein said brightness switch comprises:
   a switching member manually displaceable between said first and second brightness positions by the operation of a switching knob, said switching member being associated with a return spring, said spring having a resilience which urges said switching member into said first position whenever a lens is not mounted on said lens mount;
   a changeover switch operated by a pin fixedly mounted on said switching member, said switch being effective to enable one of said photosensitive elements for operation when said switching member is in said first position and to enable the other of said photosensitive elements for operation when said switching member is in said second position;
   a click stop mechanism including at least two detent grooves formed in said switching member, a detent ball adapted to engage one of said detent grooves, and a coiled spring which resiliently urges said ball into engagement with one of said grooves, thus maintaining said switching member in that one of said first and second positions into which it has been manually placed by operation of said knob; and
   a compression pin for compressing said coiled spring to increase the resilience of said coiled spring to a magnitude which overcomes that of said return spring when a lens is mounted on said lens mount, thus maintaining said switching member in the position into which it has been placed.

3. The combination of claim 2, in which the switching member includes a disc fixedly carrying a support shaft at its center, the switching assembly further comprising a switching knob which is adapted to angularly drive the switching member, whereby the switching member is angularly displaceable between the first and the second position.

4. The combination of claim 2 in which the return spring comprises a coil spring extending between the pin fixedly mounted on the switching member and a stationary member, the resilience of the coil spring being effective to angularly displace the switching member to its first position whenever a lens is not mounted on the camera.

5. The combination of claim 2, in which the coiled spring and the ball are disposed within a cylindrical guide member of a length sufficient so that the coiled spring expands to a length substantially corresponding to its unstressed length whenever an interchangeable lens is not mounted, thus urging the ball with a magnitude of resilience which is insufficient to overcome the resilience of the return spring.

6. The combination of claim 1, wherein said brightness switch includes a disc connected to a manually moveable operable member and being rotatable between a first switch position corresponding to said first brightness position and a second switch position corresponding to said second brightness position, said disc having two detent grooves, a first of the detent grooves corresponding to the first switch position and a second of the detent grooves corresponding to the second switch position, and further including a first urging means for urging said disc into said first switch position and a second urging means, the second urging means including:

(a) a detent ball adapted to engage said first and second detent grooves when said disc is in said first and second switch positions, respectively;

(b) a coiled spring which resiliently urges the ball into engagement with said grooves, thus maintaining the switching member in that one of the first and the second switch positions into which it has been placed when the resilience of said coiled spring is greater than that of said first urging means; and (c) a compression pin adapted to be urged by a lens as said lens is mounted on the lens mount to compress the coiled spring to increase its resilience to a magnitude sufficient to overcome the resilience of the first urging means.

* * * * *